July 21, 1959     G. B. LONG     2,895,320
WASHER

Filed June 15, 1955     6 Sheets-Sheet 1

INVENTOR.
George B. Long
BY R R Candor
His Attorney

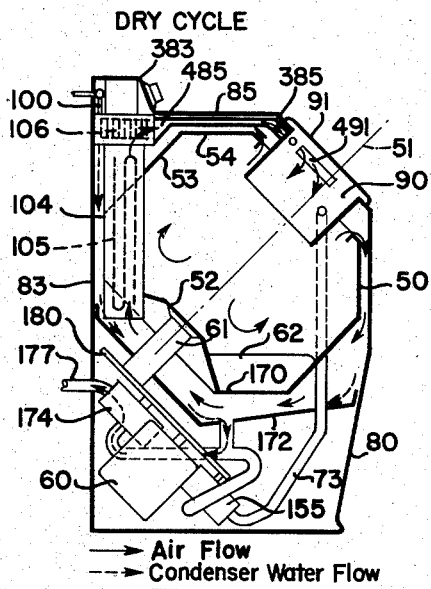
Fig. 7 — DRY CYCLE
→ Air Flow
--→ Condenser Water Flow
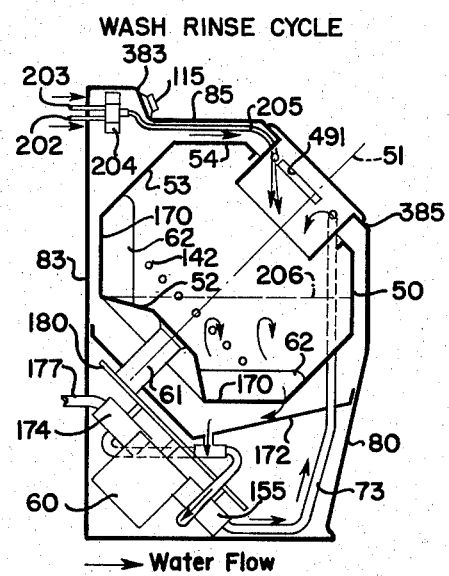
Fig. 6 — WASH RINSE CYCLE
→ Water Flow
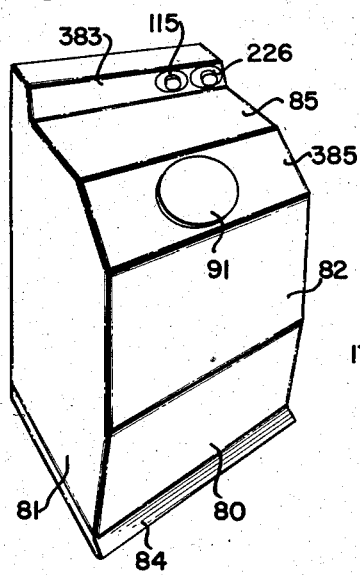
Fig. 3
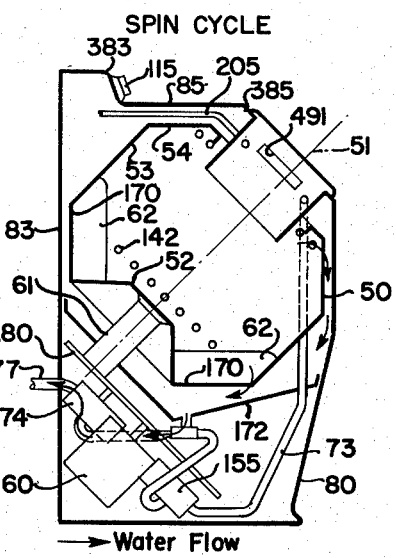
Fig. 8 — SPIN CYCLE
→ Water Flow
INVENTOR.
George B. Long
BY R R Candor
His Attorney

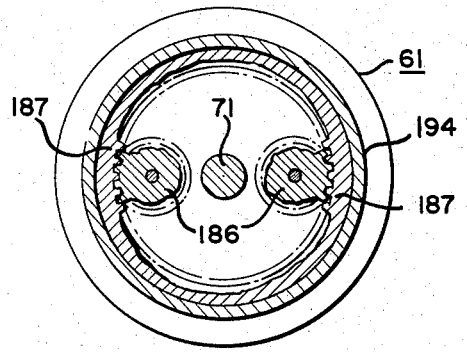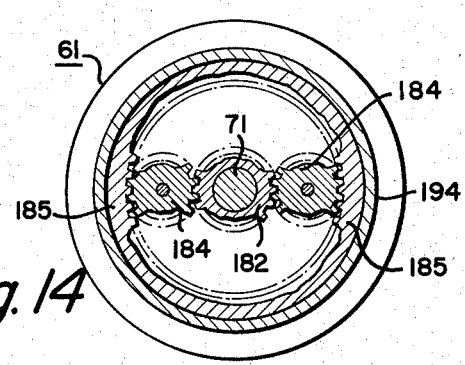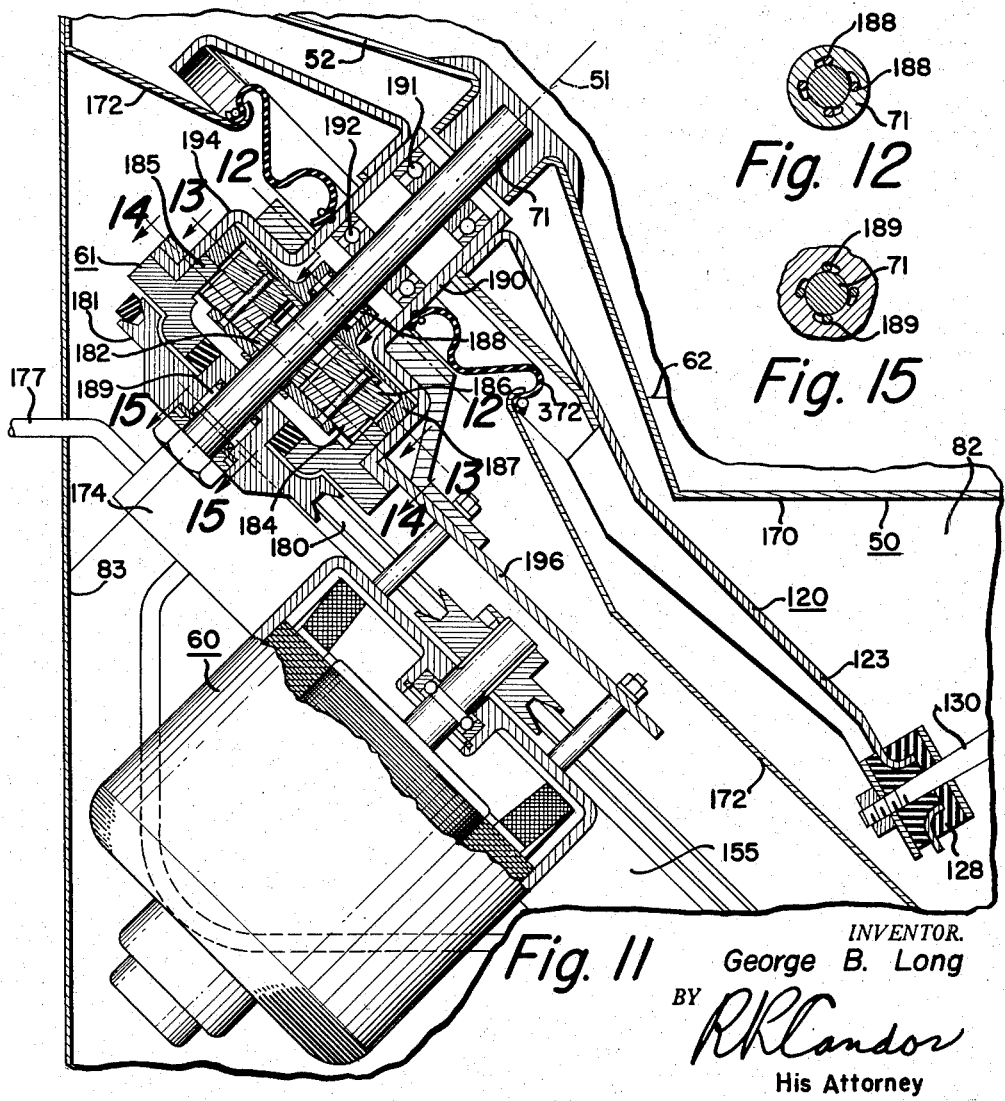

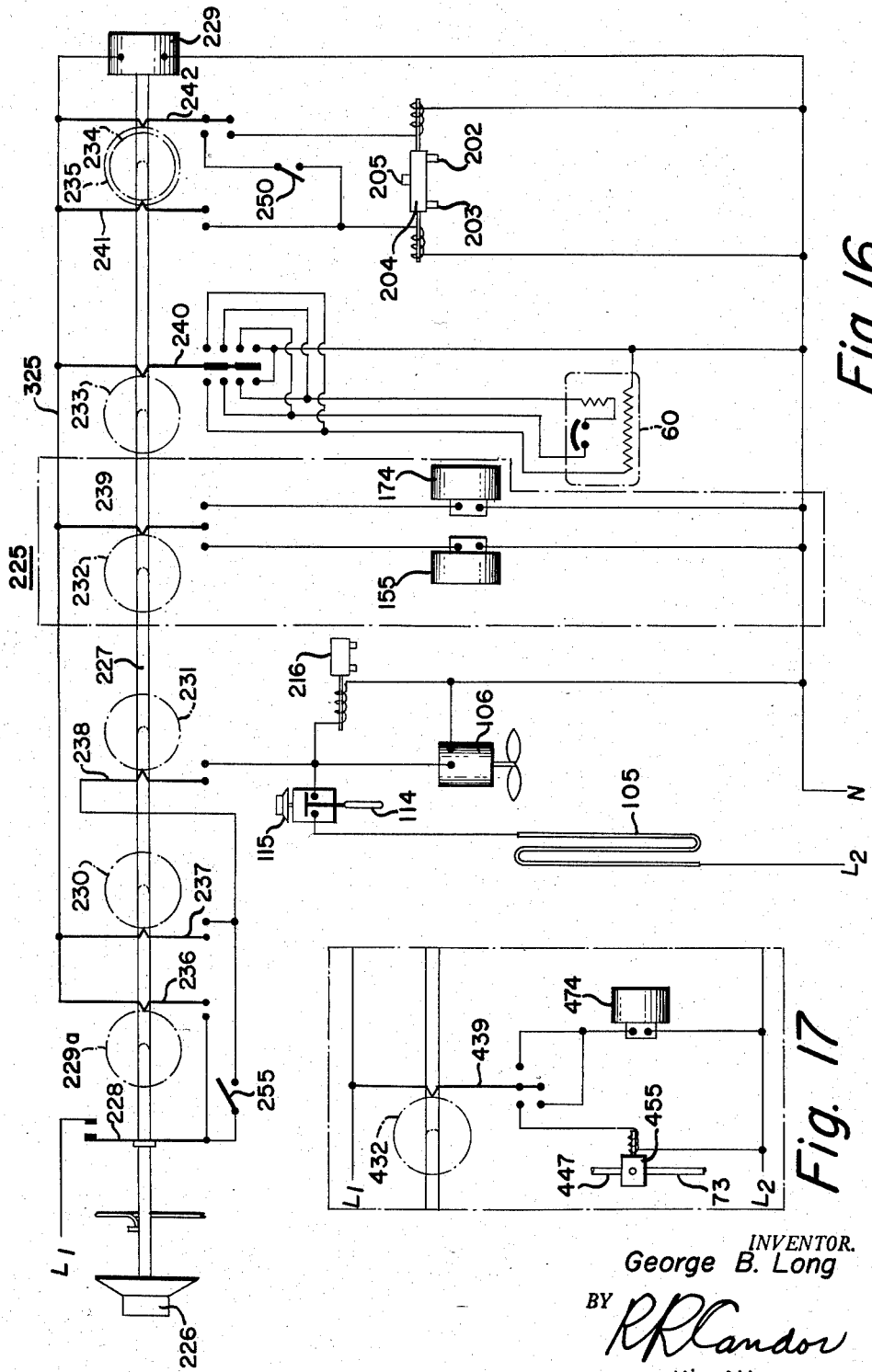

United States Patent Office 2,895,320
Patented July 21, 1959

2,895,320

WASHER

George B. Long, Dayton, Ohio, assignor to General Motors Corporation, Detroit, Mich., a corporation of Delaware Application June 15, 1955, Serial No. 515,698

4 Claims. (Cl. 68—58)

This invention relates to a domestic appliance and more particularly to automatic washing machines, automatic drying machines and combination washing and drying machines.

Some washers and most dryers and most combination washer-dryers are of the horizontal drum type. In this type the clothes must be removed from the mid-portion of the vertical front of the machine. This is especially awkward and difficult.

It is an object of this invention to provide a rotatable drum type of combination washing and drying machine which is less awkward and more convenient than the horizontal drum type.

It is another object of this invention to provide a more simple and less expensive washing machine without a separate enclosing casing employing a generally impervious tube rotating on an upwardly extending inclined axis.

These and other objects are obtained in the form shown in the drawings by providing a cabinet having a slanted upper front wall portion with an access opening. A drum is provided with an access opening coaxially arranged with the access opening in the slanting portion of the top wall. This drum is rotatably mounted upon an inclined axis and has its wall portions extending substantially around to the opening in the inclined wall portion. These walls are substantially impervious excepting for a limited number of small outlet holes arranged along the lowermost section of the diameter of the tub. The cabinet is provided with a catch basin beneath the tub and the tub is kept filled by the constantly circulating pump. Three tapered rods are fixed to the walls of the cabinet in a cantilever fashion and are symmetrically arranged about the tub. They are movably connected to the bearing support of the tub and provide a vibrationless mounting.

The machine is controlled by a timer to control the filling of the tub and to keep the tub filled by recirculating the liquid escaping from the tub through the apertures at a rate faster than the loss of the circumferential holes. The tub is rotated at the agitating speed during this recirculation to wash the clothes. The wash water is then sent to the drain and the tub is rotated at a higher speed while the liquid supply is stopped to dry the clothes. The water in the clothes escapes through the holes in the tub and is collected by a catch basin beneath and discharged. The rinse cycle includes filling, agitation and spinning operations which are similar to the initial wash period. At the end of the final rinse period a heater is energized and a blower circulates air through the tub. The heater heats this air causing the moisture to migrate and recondense upon the water covered vertical walls. A condenser hose or pipe extends across the top of the vertical walls and discharges cold water onto the walls. This cold water runs down the walls and condenses and receives the condensed moisture from the heated air.

Further objects and advantages of the present invention will be apparent from the following description, reference being had to the accompanying drawings, wherein a preferred form of the present invention is clearly shown.

In the drawings:

Figure 3 is a perspective view showing the lid in a closed position;

Figure 6 is a diagrammatic vertical sectional view illustrating the water flow during the washing and rinsing cycle;

Figure 7 is a diagrammatic vertical sectional view illustrating the air and liquid circulation during the drying cycle;

Figure 8 is a diagrammatic vertical sectional view showing the flow during the spinning cycle;

Figure 11 is a fragmentary vertical sectional view through the motor and drive means;

Figure 12 is a sectional view taken along the line 12—12 of Figure 11 showing a one-way clutch mechanism;

Figure 13 is a sectional view taken along the line 13—13 of Figure 11;

Figure 14 is a sectional view taken along the line 14—14 of Figure 11;

Figure 15 is a fragmentary sectional view taken along the line 15—15 of Figure 11;

Figure 16 is a wiring diagram of one form of the apparatus; and

Figure 17 is a wiring diagram of the second form of the apparatus.

Figure 1:
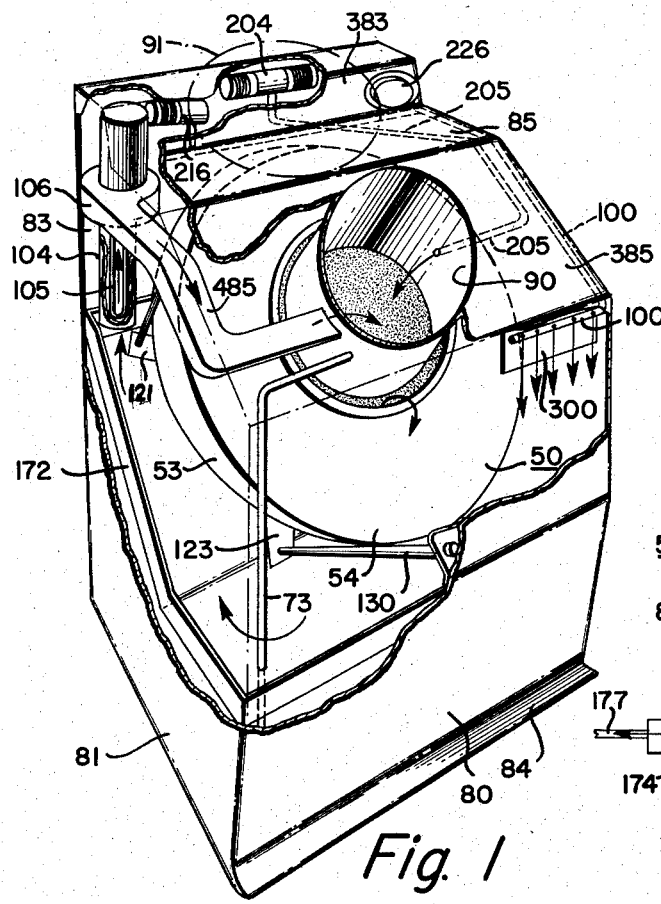
Figure 1 is a perspective view of a combined washing and drying machine embodying one form of my invention.

The mechanism shown is capable of operating as an automatic washer or an automatic dryer or a combined automatic washer-dryer. The mechanism includes a tub 50 mounted to rotate about an inclined axis 51. The tub includes the plate portion 52, an outwardly extending conical portion 170, a generally cylindrical portion 53 and an inwardly extending upper conical portion 54. The tub is also provided with inwardly extending clothes lifting fins or vanes 62 located at equal angles upon the conical portion 170 of the tub. The tub is rotated at slow speed for agitation and fluffing and at a high speed for centrifuging extraction by a motor 60 which drives the tub 50 through a two speed transmission 61.

As shown in Figure 11 an inclined shaft 71 fixed to the plate portion 52 of the tub extends along axis 51 of the tub. This shaft 71 is mounted upon ballbearings 191 and 192 which are held within a sleeve 190. The sleeve 190 is fastened to the center of a metal spider or frame 120 having side arms 121 and 122 having a forwardly and downwardly directed arm 123 and tapered side rods 124 and 125 each having their large ends fastened by a cantilever mounting to the side walls 81 and 82 of the casing. Their smaller ends are resiliently secured to the side arms 121 and 122 by rubber-like supports 128. A forward rod 130 has its large upper end connected by a rigid connection to the front 80 of the casing.

The sleeve 190 extends downwardly and flares outwardly to form a housing portion 194. This housing portion is connected to a platform 196 which supports the reversible motor 60. This reversible motor 60 is controlled by a reversing switch 240 as shown in Figure 16. The motor 60 is connected by the belt 180 to a pulley 181. The pulley 181 has an upward cylindrical extension 182 having sun gear teeth meshing with the planet gears 184. The planet gears 184 roll upon the stationary internal gear 185. The planet gears 184 are coupled directly to larger planet gears 186 which drive the internal gear 187 at a relatively low speed. The gear 187 connects through a one-way clutch 188 with the tub shaft 71 for rotating the tube 50.

When the motor 60 rotates in the opposite direction, the pulley 181 through the one-way clutch 189 is coupled directly to the tub shaft 71 to rotate the tube 50 at a much higher speed. This of course uncouples the one-way clutch 188 so that the planetary gear train is ineffective during the high speed operation.

With respect to the planetary transmission arrangement for driving the tub, this application is a continuation-in-part of my copending application Serial No. 489,965 filed February 23, 1955.

The cabinet is a generally box-shaped structure having sides 81 and 82, a front 80 and a back 83. It is also provided with a rectangular base 84 and a top 85 provided with a slanting front portion 385 and a back splash portion 383 provided with a temperature selector 115 and a timer knob 226. The slanting wall 385 is provided with a door opening 90 adapted to be closed by a round lid 91.

Figure 4:
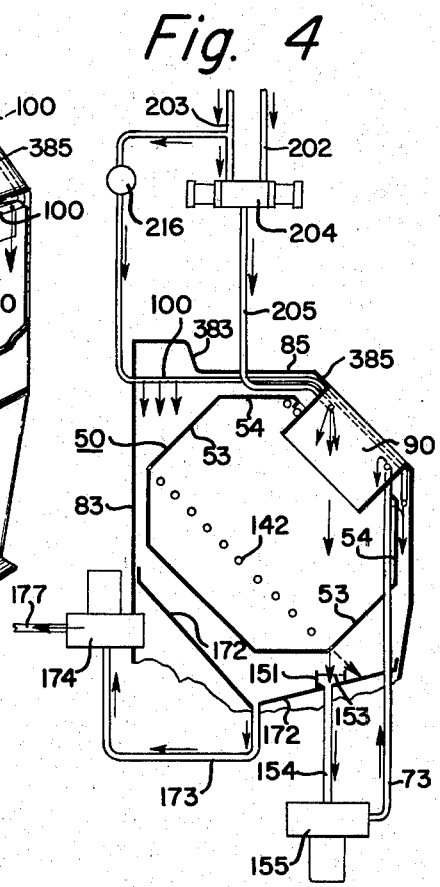
Figure 4 is a diagrammatic vertical sectional view showing the water filling and recirculating system.
Figure 2:
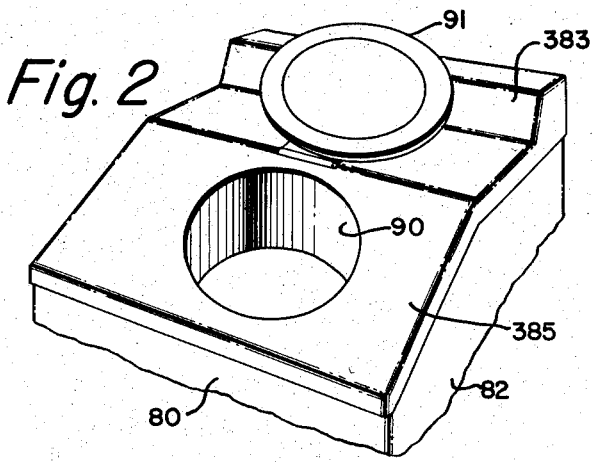
Figure 2 is a perspective view showing the access opening in the inclined wall with the lid in the open position.

One liquid system for my apparatus is shown in Figure 4 including the hot and cold water feed lines 202 and 203. These feed lines both connect to a mixing and control solenoid valve 204 which discharges into the tub fill pipe 205. The pipe 205 discharges through the opening 90 into the interior of the tub 50 and fills the tub to a level indicated by the reference character 206 in Figure 6. The angular position of this tub and the inwardly extending conical wall 54 makes it necessary that a plurality of apertures 142 be provided to extract the water from the clothes during the extracting operation. To avoid completely encasing the tub to hold the water therein, there is merely provided a partition wall or bulkhead 172 beneath the tub. This bulkhead extends between the vertical walls of the cabinet. It is provided with an elastic seal 372 extending between it and the housing 194 as shown in Figure 11.

The tub 50 is formed with a spouting or circumferential trough 143 immediately beneath the holes 142 by which the liquid escaping through the holes 142 travels down through the liquid catching rim or spouting 143 and is caught by a separate narrow receptacle or catch basin 151 directly beneath the lowest part of the spouting 143. This catch basin 151 includes a filter 153 which drains into a vertical pipe 154 connecting with the inlet of an electric pump 155 which returns the liquid through the return pipe 73 to the tub at a rate faster than the liquid escapes through the apertures 142 to keep the tub 50 filled with filtered water. During this time, the tub is being rotated at a slow agitating speed at about 60 r.p.m. so that the centrifugal force upon the water escaping through the holes 142 is relatively small and the liquid flows down the spout to its lower portion and overflows and is caught in the catch basin 151. The clothes are properly agitated and washed during this period. After this period, the motor 60 is reversed and directly drives to rotate the tube 50 at a much higher speed. The electric pump 155 is stopped and the liquid is thrown out radially from the apertures 142 and the spout 143 so that it is thrown to one side of and beyond the catch basin 151. It is caught by the bulkhead and conducted through the conduit 173 and pumped by the electric pump 174 through a pipe 177 to a suitable drain.

Figure 5:
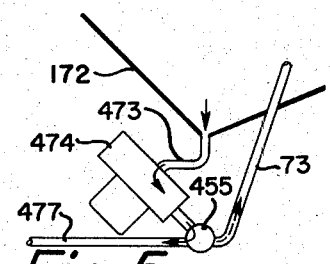
Figure 5 is a fragmentary diagrammatic sectional view showing a modified water recirculating and draining system.
Figure 9:
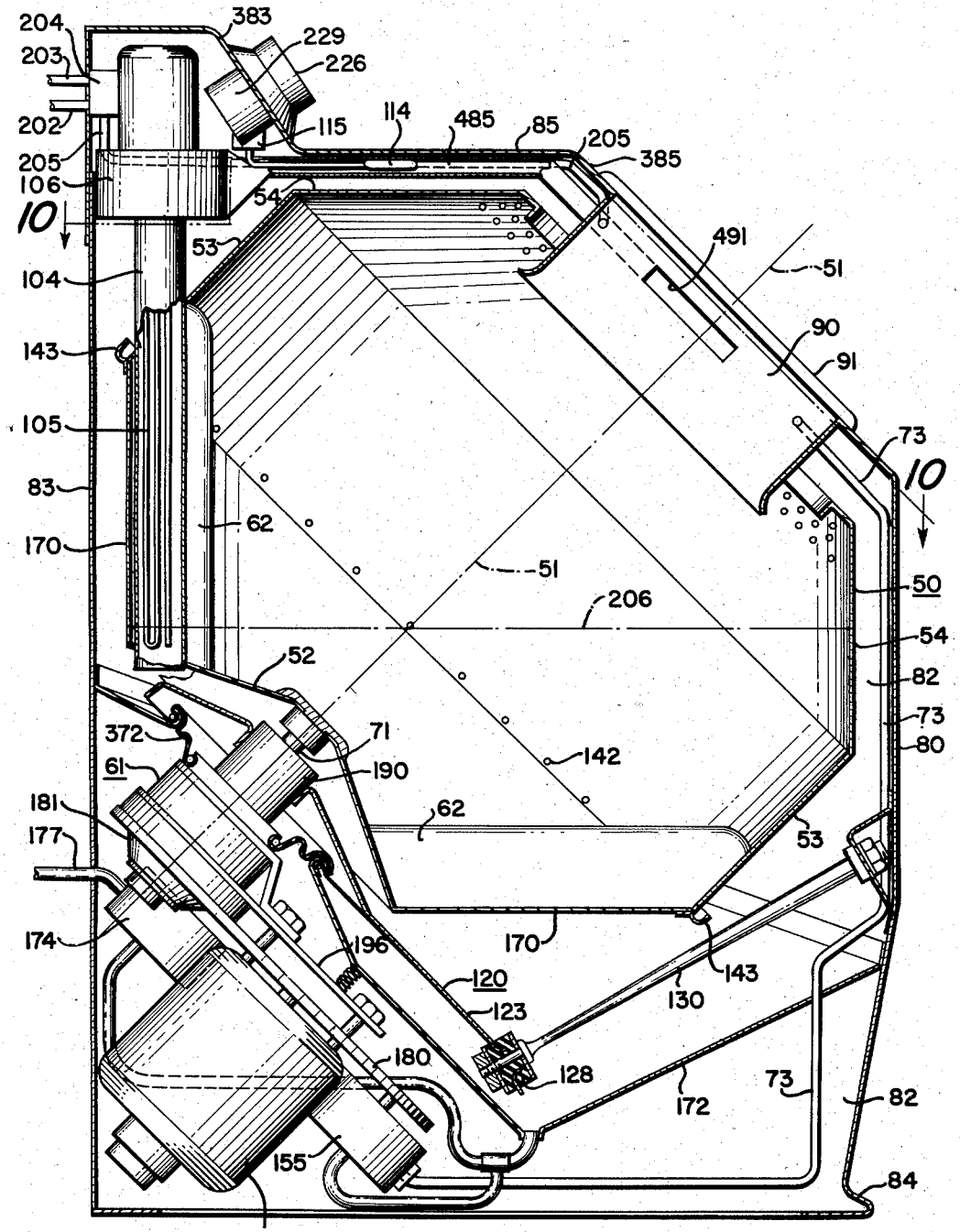
Figure 9 is a vertical sectional view taken along the line 9—9 of Figure 10.
Figure 10:
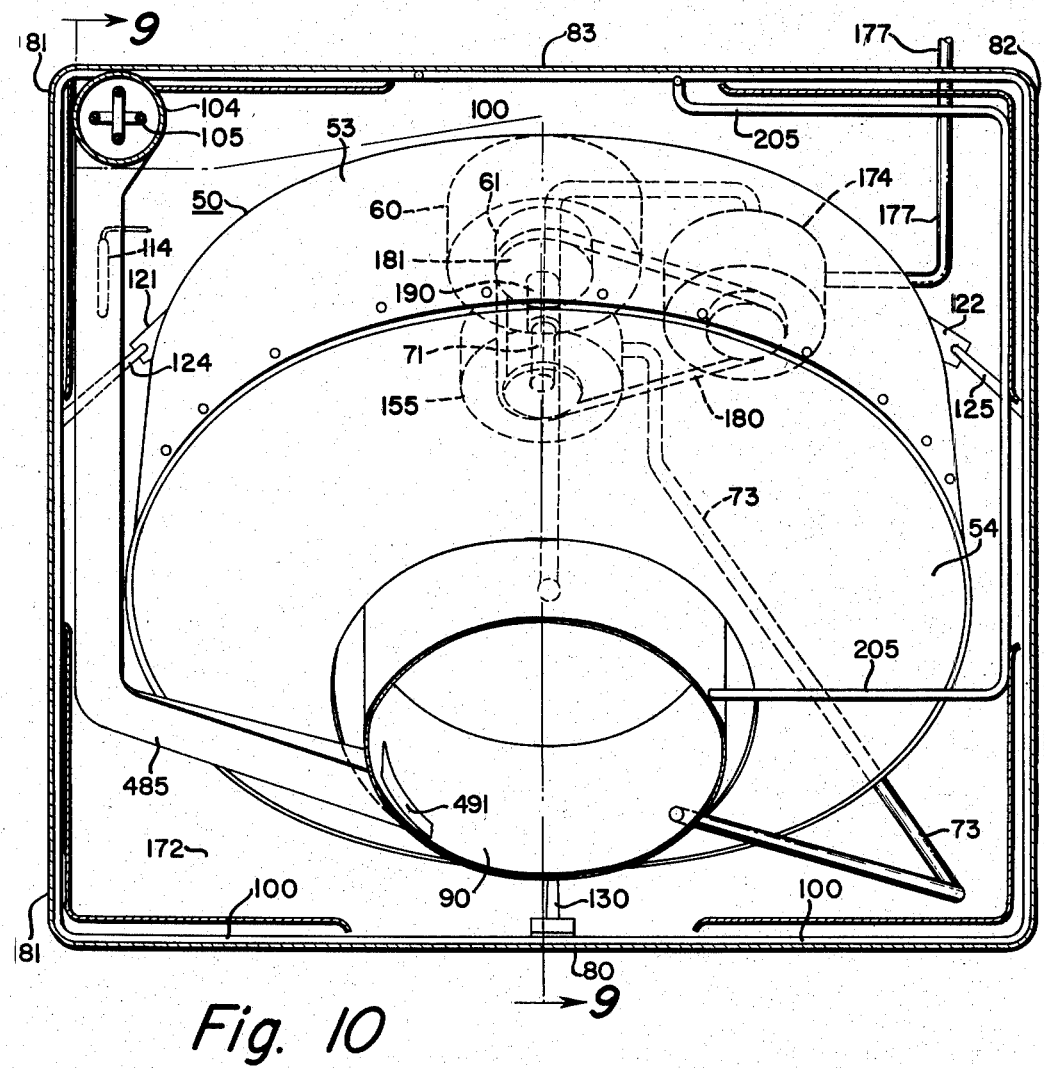
Figure 10 is a top sectional view taken along the line 10—10 of Figure 9.

In the form shown in Figure 5 the catch basin 151 and the filter 153 are eliminated and all the water is caught by the bulkhead 172. The liquid collected by the bulkhead passes through a pipe 473 to a single electric pump 474. This single pump has its outlet connected to a two-way valve 455 having one alternate outlet connected to the pipe 73 for return to the tub to keep the tub 50 filled during the filling and agitating periods while the second outlet discharges through the drain conduit 477 during the centrifuging period. By either of these recirculating systems, the tub is kept filled since the pump has a greater capacity to fill the tub than the circumferential series of apertures 142 have to drain the tub. For this reason it is unnecessary to use an enclosing casing for the tub or to provide any valves for closing the apertures 142 during the agitating period.

Following the centrifuging operation, a blower 106 located beneath the back splash portion 383 draws air from the lower portion of the interior of the cabinet above the bulkhead 172 through a vertical tube 104 containing an electric heater 105. This air is discharged through a horizontal duct 485 and discharges through an aperture 491 in the door opening into the interior of the tub 50 as indicated by the arrows in Figure 7. The heated air picks up moisture within the tub 50 and escapes through the opening between the door opening collar 90 and the open end of the tub 50.

The moisture is condensed out of this circulating air by the cold condenser water which is discharged from a condenser spray hose or pipe 100 which sprays or discharges water against the inside surfaces of the cabinet. This flow is controlled by a solenoid valve 216 which controls the flow of cold water to the condenser hose 100. During this time, the pump 174 or the pump 474 is operated to remove the condenser water to the drain after it has absorbed moisture from the air. The condenser hose may be provided with a condenser baffle 300 to insure that the water discharged from the condenser hose or pipe flows on the inner surface of the walls of the cabinet until it reaches the bulkhead 172.

The control for the apparatus is accomplished by an electrical timing system 225 as shown in Figure 16. This timing system includes a knob 226 secured to the shaft 227 which may be pushed axially to the right in Figure 16 to close the line switch 228. The shaft 227 is connected to and driven by the timer motor 229 in step by step progression. In general the timing system may be of the type described and claimed in the Sisson Patent No. 2,549,025 issued April 17, 1951 with additional or substituted cams and switch blades to energize the various circuits shown in Figure 16. The pushing of the knob 226 to the right in Figure 16 closes the switch 228 connecting the line $L_1$ to the switches 255 and 236.

If washing only or drying only is desired, the switch 255 is left open. The knob 226 is then turned until either the cam 229a closes the switch 236 to initiate a washing cycle or the knob 226 is turned farther until the cam 230 closes the switch 237 to initiate a drying cycle. To provide a combined washing and drying cycle, the switch 255 is closed. In either case the line $L_1$ is connected to the line 325 until either the end of the washing period or the end of the drying period according to the setting of the knob 226 and the position of the switch 255.

This connection energizes the timer motor 229 for corresponding periods of operation. The timer motor operates the shaft 227 containing all the cams thereon. The initial fill and selective wash time operations are controlled principally by the cams 234 and 235 which may be similar to the initial fill and wash cams of the Sisson Patent 2,549,025. The cam 234 controls the switch 241 which connects the conductor 325 to the neutral conductor N to energize the solenoid to open the cold water outlet 203 of the valve 204 for the proper period of time while the cam 235 controls the switch 242 to energize the hot water solenoid to control the flow of hot water through the outlet 202 of the valve 204. The switch 242 also connects to a cross circuit including the switch 250 connecting with the solenoid controlling the cold or tepid water inlet to the valve 204. When the switch 250 is open, the tub 50 will receive a hot water initial fill. The rinse periods will be provided with cold or tepid water. If the switch 250 is closed all of the fills will be provided by the cold or tepid water. At the same time, the cam 232 will operate the switch 239 to make connection with the pump 155 to cause this pump to return any liquid draining out of the tub through the apertures 242.

After the tub is wholly or partly filled, the cam 233 will move the switch 240 to one of its operating positions to cause the motor 60 to turn in the direction to cause rotation of the tub at a slow speed through the planetary gears by the engagement of the one-way clutch 188. This causes the tub to be rotated at a speed suitable for agitating the clothes therein such as 60 r.p.m. After a long period of time, the switches 241 and 242 are opened by the dual cams 234 and 235. The operation of the motor 60 continues until the clothes are clean.

At this time, the cam 233 moves the switch 240 to its opposite position to reverse the motor 60 so that the clutch 189 is engaged while the clutch 188 is disengaged for high speed rotation of the tub 50. This speed may be any suitable desired speed, for example between 200 and 500 r.p.m. At the same time, the cam 232 moves the switch 239 to its opposite position to deenergize the pump 155 to stop the recirculation and to energize the pump 174. The rotation of the drum at high speed causes the liquid in the clothes to be forced out by the apertures 142 in the tub 50. This liquid will be thrown over and beyond the collecting basin 151 as shown in Figure 4 and collected by the bulkhead 172. The liquid collected in the bulkhead will be drawn out through the conduit 173 and pumped by the pump 174 through the conduit 177 to a suitable drain. One or more rinsing cycles follow in which the fill is made of all cold or tepid water under the control of the cam 234 and the switch 241.

During the agitation portion of each rinse period, the switch 240 will be returned by the cam 233 to the same position it occupied during the initial agitating period. The cam 232 will likewise move the switch 239 to energize the pump 155 to recirculate the rinse liquid if desired. Each rinse period ends in a spin period in which the switch 240 is moved to reverse the motor 60 while the cam 232 moves the switch 239 to deenergize the pump 155 and to energize the pump 174. If the switch 255 is open the cam 229 will open the switch 236 at the end of the final spin of the last rinse period.

If the switch 255 is closed, the current will continue to flow through the switches 255 and 237 to the timer motor 229 until the end of the drying period. The cam 232 will move the switch 239 to reenergize the pump 174 for the purpose of pumping the condensate water to a suitable drain. The cam 232 will move the switch 240 to the low speed position to cause the motor 60 to operate in the direction to engage the clutch 188 for slow speed operation of the tub 50. If desired the cam 233 may shift the switch 240 periodically to provide some short periods of high speed operation. During the drying period, the cam 231 closes the switch 238 to energize and open the cold water valve 216 to allow the feeding of cold water to the condenser tube 100. At the same time the blower 106 and the heater 105 are energized to circulate the air through the tub in the circuit shown in Figure 7. The energization and opening of the valve 216 causes cold water to flow down the inner surface of the inner walls of the cabinet to absorb moisture from the circulating air. When the circulating air reaches a temperature selected by the dial 115 as measured by the bulb 114 this thermostat switch controlled by the bulb 114 will open to deenergize the heater 105. When the clothes are cooled and dried, the cam 231 will open the switch 238 to close the valve 216 and stop the fan or blower 106. At the same time the cam 230 will open the switch 237 to stop the timer motor 229, the motor 60 and the pump 174 to complete the drying period.

For the modification shown in Figure 5 the pump circuit is modified to provide a different cam 432 and a switch 439 replacing the cam 232 and the switch 239. The switch 439 has a double contact. During the agitation period only the pump 474 is energized and the two-way valve 455 is turned to recirculate the water through the conduit 73. However during the centrifuging period and during the drying period the cam 432 moves the switch 439 to connect to the solenoid of the two-way valve 455 as well as to the pump 474 so that the liquid is pumped to the drain in each instance.

This arrangement provides a combined washer-dryer of simple design and simple construction.

While the form of embodiment of the invention as herein disclosed constitutes a preferred form, it is to be understood that other forms might be adopted, as may come within the scope of the claims which follow.

What is claimed is as follows:

1. A washing machine including a cabinet, a rotatable tub at an angle in said cabinet and provided with an inclined axis of rotation, said tub having an inwardly turned rim for holding liquid and clothes therein, a transverse bulkhead forming a catch basin beneath said tub, said tub having concentric wall portions of different diameters and a series of small apertures extending around its greatest diameter and being otherwise substantially imperforate, said tub having a liquid catching rim immediately beneath said apertures, said bulkhead having a separate narrow receptacle directly beneath the lowermost apertures of said tub, a first pump having its inlet connected to said receptacle and having a discharge connection discharging into said tub, said first pump having a pumping capacity greater than the liquid flow through said apertures, and a second pump having its inlet connected to said bulkhead and having a discharge connection extending to a drain.

2. A washing machine including a cabinet, a rotatable tub at an angle in said cabinet and provided with an inclined axis of rotation, said tub having an inwardly turned rim for holding liquid and clothes therein, a transverse bulkhead forming a catch basin beneath said tub, said tub having concentric wall portions of different diameters and a series of small apertures extending around its greatest diameter substantially to its lowest point for complete gravity drainage and having an access opening and being otherwise substantially imperforate, pump means having inlet means connected to said bulkhead and also having outlet means, said pump means having a pumping capacity much greater than the flow of liquid at any time through said apertures to keep the liquid level in the bulkhead below the tub, said tub having a normal liquid level, a recirculating connection extending from said outlet means back to the tub for recirculating any liquid flowing through said aperture at a rate sufficient to substantially maintain the normal liquid level, said tub having a circumferential trough on and encircling its outer peripheral surface alongside and beneath said series of small apertures for directing the gravity induced flow from the apertures to the lowest point of the trough.

3. A washing machine including a cabinet, a rotatable tub at an angle in said cabinet and provided with an inclined axis of rotation, said tub having an inwardly turned rim for holding liquid and clothes therein, a transverse bulkhead forming a catch basin beneath said tub, said tub having concentric wall portions of different diameters and a series of small apertures extending around its greatest diameter substantially to its lowest point and having an access opening and being otherwise substantially imperforate, pump means having inlet means connected to said bulkhead and also having outlet means, said pump means having a pumping capacity much greater than the flow of liquid at any time through said apertures to keep the liquid level in the bulkhead below the tub, said tub having a normal liquid level, a recirculating connection extending from said outlet means back to the tub for recirculating any liquid flowing through said aperture at a rate sufficient to substantially maintain the normal liquid level, said tub having a circumferential trough on its outer surface alongside and beneath said series of small apertures for directing the flow from the apertures to a specific portion of the lowest point of the tub at all times, said bulkhead having a catch basin directly beneath the lowest point of said trough, said pump inlet means including one inlet means connected to said catch basin and one inlet means connected to the bulkhead outside of the catch basin.

4. A washing machine including a cabinet, a rotatable gravity draining tub at an angle in said cabinet and provided with an inclined axis of rotation, said tub having an inwardly turned rim for holding liquid and clothes therein, a transverse bulkhead forming a catch basin beneath said tub, said tub having a series of small apertures extending around its greatest diameter substantially to its lowest point permitting slow but complete gravity drainage even to the bottom of the tub and being otherwise substantially imperforate, a pump having its inlet connected to said bulkhead and also having an outlet, said pump having a pumping capacity sufficiently greater than the liquid flow through said apertures to keep the liquid level in the bulkhead below the tub and to keep the tub filled to the desired level, a two-way valve having its inlet connected to said pump outlet and having two outlets, a recirculating connection extending from one of said valve outlets back to the tub for recirculating into the tub any liquid flowing out of said holes into said bulkhead, and a drain connection extending from the other valve outlet.

References Cited in the file of this patent

UNITED STATES PATENTS

| | | |
|---|---|---|
| 2,298,096 | Dunham | Oct. 6, 1942 |
| 2,356,818 | Bruckman | Aug. 29, 1944 |
| 2,554,229 | Woodson | May 22, 1951 |
| 2,561,257 | Woodson | July 17, 1951 |
| 2,621,505 | Smith | Dec. 16, 1952 |